(12) United States Patent
Roy et al.

(10) Patent No.: US 12,153,738 B2
(45) Date of Patent: Nov. 26, 2024

(54) GESTURE CONTROLLED INTERFACE FOR IN-FLIGHT USERS

(71) Applicant: Goodrich Lighting Systems, Inc., Phoenix, AZ (US)

(72) Inventors: Kingshuk Roy, Bangalore (IN); Vaitheeshwari Jaisankar, Bangalore (IN)

(73) Assignee: GOODRICH LIGHTING SYSTEMS, INC., Phoenix, AZ (US)

(*) Notice: Subject to any disclaimer, the term of this patent is extended or adjusted under 35 U.S.C. 154(b) by 78 days.

(21) Appl. No.: 18/077,925

(22) Filed: Dec. 8, 2022

(65) Prior Publication Data

US 2024/0085986 A1   Mar. 14, 2024

(30) Foreign Application Priority Data

Sep. 9, 2022 (IN) .............................. 202211051674

(51) Int. Cl.
  *G06F 3/01* (2006.01)
  *G08C 19/00* (2006.01)

(52) U.S. Cl.
  CPC ............. *G06F 3/017* (2013.01); *G08C 19/00* (2013.01)

(58) Field of Classification Search
  None
  See application file for complete search history.

(56) References Cited

U.S. PATENT DOCUMENTS

| | | | |
|---|---|---|---|
| 9,037,354 B2 | 5/2015 | Mondragon et al. | |
| 9,296,333 B2 | 3/2016 | Rittner et al. | |
| 10,144,512 B2 | 12/2018 | Gagnon et al. | |
| 10,146,320 B2 | 12/2018 | Schalla et al. | |
| 10,423,237 B2 | 9/2019 | Episkopos et al. | |
| 11,144,129 B2 | 10/2021 | Khabrani | |
| 11,175,741 B2 | 11/2021 | Morrison | |
| 2010/0199228 A1 | 8/2010 | Latta et al. | |
| 2013/0063340 A1 | 3/2013 | Mondragon et al. | |
| 2013/0066526 A1* | 3/2013 | Mondragon | B64D 47/08 701/49 |

(Continued)

FOREIGN PATENT DOCUMENTS

| | | | | |
|---|---|---|---|---|
| CA | 2928262 C | * | 6/2018 | ............ B25J 11/009 |
| CN | 109376512 A | * | 2/2019 | |

(Continued)

OTHER PUBLICATIONS

European Patent Office, European Search Report dated Feb. 6, 2024 in Application No. 23196277.0.

*Primary Examiner* — Fekadeselassie Girma
(74) *Attorney, Agent, or Firm* — SNELL & WILMER L.L.P.

(57) ABSTRACT

A system for controlling in-flight services using gestures is disclosed. The system comprises: a gesture detection device; an actuator; and a controller. The controller is configured to: receive a detected free space gesture from the gesture detection device; compare the detected free space gesture to a plurality of identified free space gestures; responsive to identifying a free space gesture from the plurality of identified free space gestures, identify an associated in-flight service based on the identified free space gesture; and responsive to identifying the associated in-flight service, send a first command to the actuator to perform the associated in-flight service.

18 Claims, 8 Drawing Sheets

(56) References Cited

U.S. PATENT DOCUMENTS

| | | |
|---|---|---|
| 2014/0003659 A1 | 1/2014 | Hoffmann et al. |
| 2018/0079507 A1 | 3/2018 | Klose |
| 2018/0136733 A1 | 5/2018 | Schalla et al. |
| 2019/0344892 A1 | 11/2019 | Pozzi |
| 2022/0001985 A1* | 1/2022 | Bathla .............. B64D 11/00151 |
| 2022/0094782 A1* | 3/2022 | Mendiratta ............. G06F 18/22 |
| 2022/0100280 A1* | 3/2022 | Nocon ................... A63H 33/22 |
| 2022/0119241 A1* | 4/2022 | Chang .................... G06V 40/20 |
| 2022/0301041 A1* | 9/2022 | Lee ......................... G06F 9/453 |
| 2022/0309471 A1* | 9/2022 | Horan ................. G06V 40/172 |
| 2022/0350415 A1* | 11/2022 | Jatti ........................ G06F 3/017 |
| 2023/0027040 A1* | 1/2023 | Wang ................... G06V 10/809 |
| 2023/0350495 A1* | 11/2023 | Vaday ................... G06V 20/20 |

FOREIGN PATENT DOCUMENTS

| | | | |
|---|---|---|---|
| RU | 2707492 | 11/2019 | |
| TW | 201723425 A * | 7/2017 | ............. B25J 5/007 |

* cited by examiner

FIG.7A OPEN

FIG.7B LIGHT

FIG.7C HELP

FIG.7D FAN

FIG.9

GESTURE CONTROLLED INTERFACE FOR IN-FLIGHT USERS

CROSS-REFERENCE TO RELATED APPLICATIONS

This application claims priority to, and the benefit of, India Patent Application No. 202211051674 (DAS CODE: CA33), filed Sep. 9, 2022, and titled "GESTURE CONTROLLED INTERFACE FOR IN-FLIGHT USERS," which is incorporated by reference herein in its entirety for all purposes.

FIELD

The present disclosure relates to systems and methods for controlling in-flight services, and more specifically, to using gestures to control in-flight services.

BACKGROUND

The world is getting more connected by the day. Currently, over 4.6 billion passengers are transported by global commercial airlines and this number is set to grow to a staggering 7.8 billion by 2036. Airports and airlines are under sustained pressure to increase capacity, improve passenger experience and manage long-term traffic growth safely, cost-effectively and with less impact on the environment. It is clear that air and ground travel workflows must adapt not only to reduce costs but, importantly, to give passengers a better, customer friendly and relaxed traveling experience. Over time, in order to stay competitive, it has become important for airlines to revisit the customers' requirements and understand them better. With the advancement in technology, customers expect to have a more powerful and hassle-free user interface.

SUMMARY

Disclosed herein is a system for controlling in-flight services using gestures. The system includes a gesture detection device; an actuator; and a controller, where the controller is configured to: receive a detected free space gesture from the gesture detection device; compare the detected free space gesture to a plurality of identified free space gestures; responsive to identifying a free space gesture from the plurality of identified free space gestures, identify an associated in-flight service based on the identified free space gesture; and, responsive to identifying the associated in-flight service, send a first command to the actuator to perform the associated in-flight service.

In various embodiments, the detected free space gesture is at least one of a movement of hands, fingers, or a head. In various embodiments, the movement of the head is at least one of a head pose, a nod, an eye movement, or a facial expression. In various embodiments, the movement of the fingers is at least one of pointing in at least one of an up direction, a down direction, a left direction, or a right direction. In various embodiments, the movement of the hands is a wave or sign language. In various embodiments, the sign language comprises a sign language sign or a sign language letter.

In various embodiments, the associated in-flight service is at least one of turning on a reading light, turning off the reading light, turning on air, turning off the air, turning on a flight attendant call signal, opening a door to a storage bin, or closing the door to the storage bin. In various embodiments, the gesture detection device is at least one of a visual sensing device, ultrasound sensing device, an infrared proximity sensing device, a graphical user interface (GUI), or a sensor module including an IR source and an IR camera.

In various embodiments, the controller is further configured to, responsive to a failure to identify the free space gesture from the plurality of identified free space gestures, send a second command back to the gesture detection device to inform a user of an unrecognizable free space gesture. In various embodiments, the free space gesture is a sequence of free space gestures.

Also disclosed herein is a method for controlling in-flight services using gestures. The method includes receiving, by a controller, a detected free space gesture from a gesture detection device; comparing, by the controller, the detected free space gesture to a plurality of identified free space gestures; responsive to identifying a free space gesture from the plurality of identified free space gestures, identifying, by the controller, an associated in-flight service based on the identified free space gesture; and responsive to identifying the associated in-flight service, sending, by the controller, a first command to an actuator to perform the associated in-flight service.

In various embodiments, the detected free space gesture is at least one of a movement of hands, fingers, or a head. In various embodiments, the movement of the head is at least one of a head pose, a nod, an eye movement, or a facial expression. In various embodiments, the movement of the fingers is at least one of pointing in at least one of an up direction, a down direction, a left direction, or a right direction. In various embodiments, the movement of the hands is a wave or sign language. In various embodiments, the sign language comprises a sign language sign or a sign language letter.

In various embodiments, the associated in-flight service is at least one of turning on a reading light, turning off the reading light, turning on air, turning off the air, turning on a flight attendant call signal, opening a door to a storage bin, or closing the door to the storage bin. In various embodiments, the gesture detection device is at least one of a visual sensing device, ultrasound sensing device, an infrared proximity sensing device, or a graphical user interface (GUI), or a sensor module including an IR source and an IR camera.

In various embodiments, the method further comprises, responsive to a failure to identify the free space gesture from the plurality of identified free space gestures, sending, by the controller, a second command back to the gesture detection device to inform a user of an unrecognizable free space gesture. In various embodiments, the free space gesture is a sequence of free space gestures.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Currently, services, such as a passenger's reading lighting, air conditioning, and flight attendant call signal are placed above the passenger and are operated manually. Additionally, doors to the overhead storage bins are closed manually by passengers or flight attendants.

However, manual operating the passenger's reading lighting, air conditioning, and flight attendant call signal as well as a door to the overhead storage bins have many drawbacks. For example, for a passenger who is not able to easily reach the overhead panel, that passenger must get up every time to activate or deactivate the reading lighting, air conditioning, flight attendant call signal, and/or open and close the door to the overhead storage bins.

Disclosed herein is a system and method for using gestures to control in-flight services. The system and method disclosed herein provides for the passenger and/or flight attendant to use gestures to control one or more of the passenger's reading lighting, air conditioning, flight attendant call signal, and overhead storage bin doors. Utilizing gestures to activate or deactivate the reading lighting, air conditioning, flight attendant call signal, and/or open and close the door to the overhead storage bins reduces a need for passengers to get up every time to operate the switch panels placed overhead and provides autonomy to disabled passengers. Also, considering a pandemic situation, utilizing gestures to activate or deactivate the reading lighting, air conditioning, flight attendant call signal, and/or open and close the door to the overhead storage bins ensures touchless points in future advancements. This provides safer environment to the passengers also reduces the ambiguity in passengers point of view.

Figure 1:
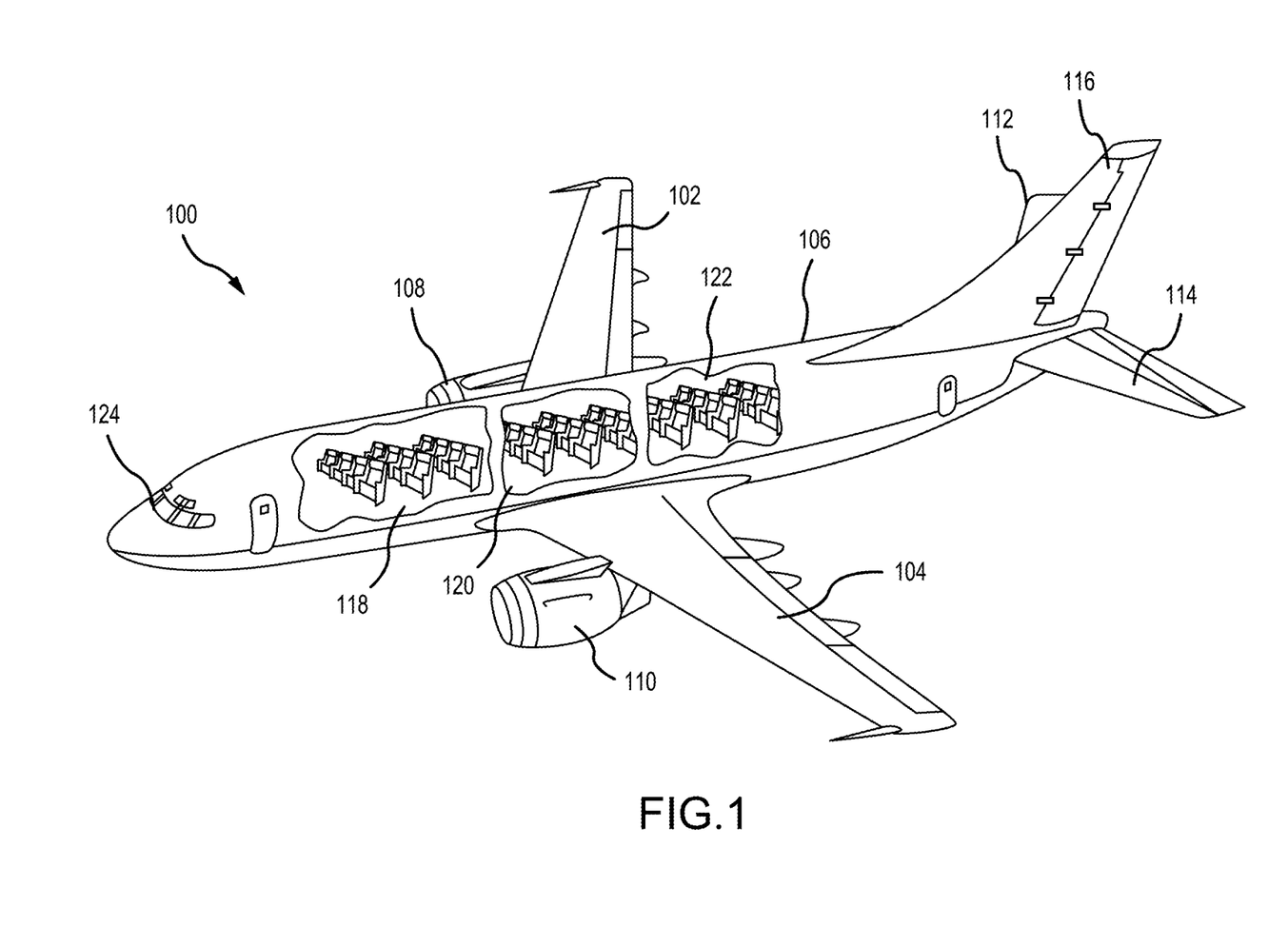
FIG. 1 illustrates an aircraft and various sections within the aircraft, in accordance with various embodiments.

Referring now to FIG. 1, in accordance with various embodiments, an aircraft 100 and various sections within the aircraft is illustrated. The aircraft 100 is an example of a passenger or transport vehicle in which gesture-controlled systems may be implemented in accordance with various embodiments. In various embodiments, the aircraft 100 has a starboard wing 102 and a port wing 104 attached to a fuselage 106. In various embodiments, the aircraft 100 also includes a starboard engine 108 connected to the starboard wing 102 and a port engine 110 connected to the port wing 104. In various embodiments, the aircraft 100 also includes a starboard horizontal stabilizer 112, a port horizontal stabilizer 114, and a vertical stabilizer 116. In various embodiments, the aircraft 100 also includes various cabin sections, including, for example, a first cabin section 118, a second cabin section 120, a third cabin section 122, and a pilot cabin 124.

Figure 2:
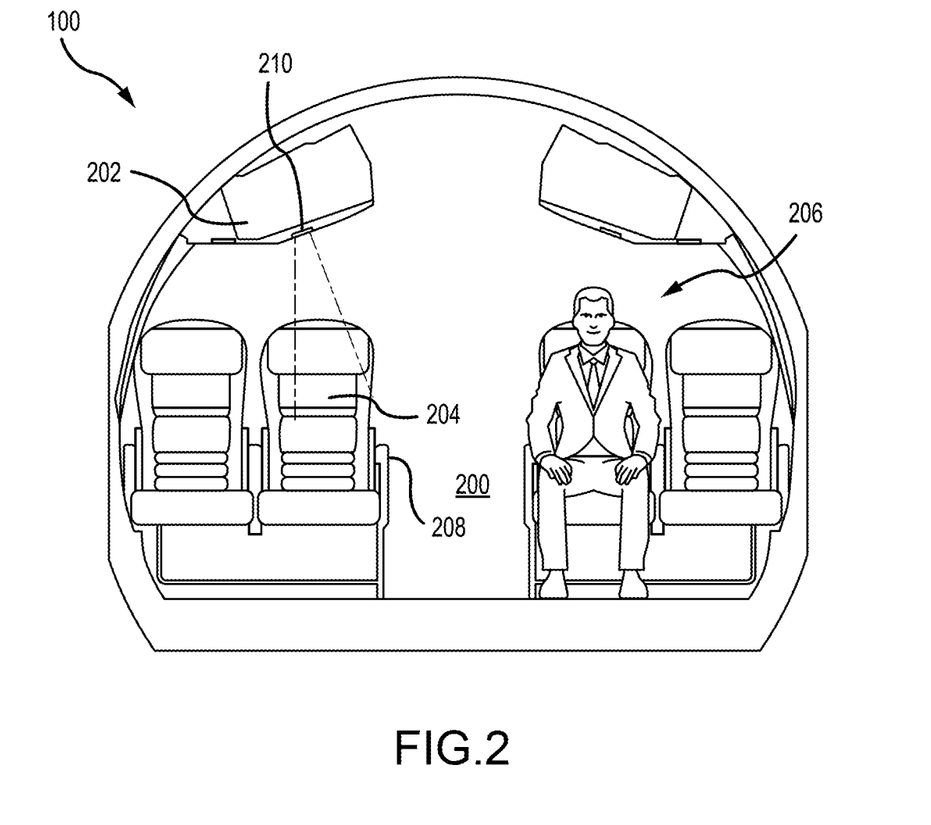
FIG. 2 illustrates a cabin of an aircraft, in accordance with various embodiments.

Referring now to FIG. 2, in accordance with various embodiments, a cabin of an aircraft 100 is illustrated. Cabin 200 may be a cabin such as the first cabin section 118, the second cabin section 120, or the third cabin section 122 of FIG. 1. In various embodiments, the cabin 200 may include overhead storage bins 202, passenger seats 204 for supporting passengers 206, armrest 208, lavatory surfaces, PEDs, and other structures/surfaces. In various embodiment, the cabin 200 may include passenger service units (PSUs) 210 that control various functions for passengers in the cabin 200, such as reading lighting, air conditioning, and a flight attendant call signal.

Figure 3:
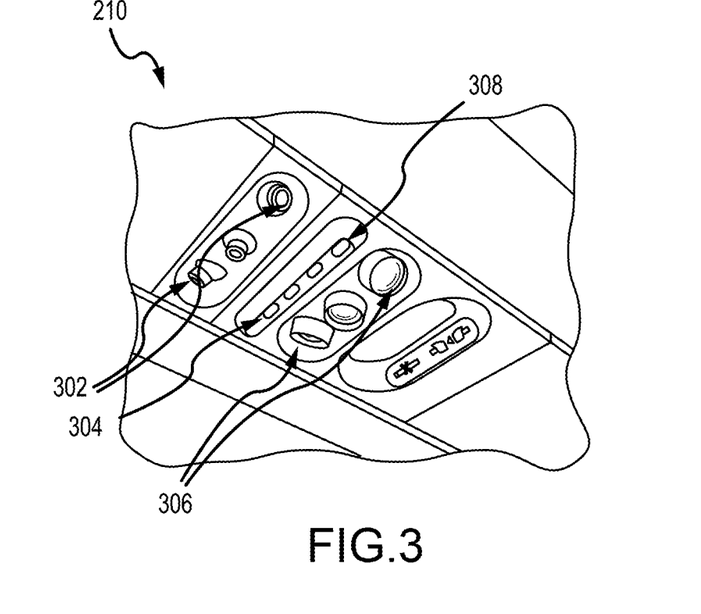
FIG. 3 illustrates a view of passenger service unit (PSU) as seen from a passenger sitting on one of the passenger seats below the PSU, in accordance with various embodiments.

Referring now to FIG. 3, in accordance with various embodiments, a view of passenger service unit (PSU) as seen from a passenger sitting on one of the passenger seats below the PSU is illustrated. In various embodiments, the PSU 210 includes a row of three adjacent aircraft passenger cabin gaspers 302, hereinafter referred to as "gaspers" 302. In various embodiments, the gaspers 302 are configured for blowing air towards the passengers, sitting on the passenger seats below the PSU 210. In various embodiments, the gaspers 302 have circular or nearly circular cross-sections. In various embodiments, the gaspers 302 in particular have a circular outlet for delivering air towards the passengers. In various embodiments, electrical switches 304 are provided next to reading lights 306. In various embodiments, each electrical switch of the electrical switches 304 is configured for switching an adjacent and associated reading light of reading lights 306, which is arranged next to the electrical switches 304 on the side opposite to the gaspers 302. In various embodiments, switch 308 is a call button for triggering a signal for calling flight attendant personnel.

Figure 4:
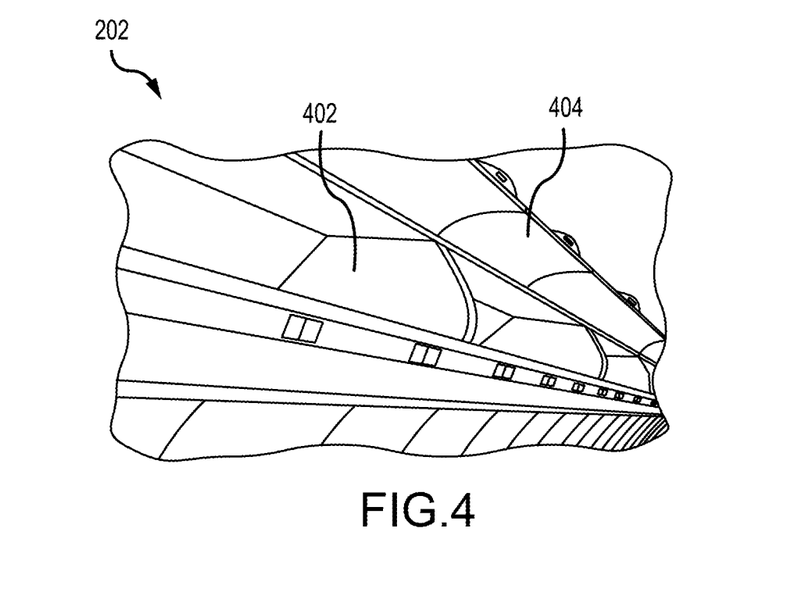
FIG. 4 illustrates a view of an overhead storage bins, in accordance with various embodiments.

Referring now to FIG. 4, in accordance with various embodiments, a view of an overhead storage bins 202 of FIG. 2 is illustrated. In various embodiments, the overhead storage bins 202 in one or more of the various cabin sections, such as the first cabin section 118, the second cabin section 120, or the third cabin section 122 of FIG. 1, may include one or more of the walls 402 and a door 404 that form the overhead storage bins 202. In various embodiments, the door 404 may be in a closed position, as is illustrated with regard to overhead storage bins 202 of FIG. 2, or in an open position, as is illustrated with regard to door 404 in FIG. 4.

Figure 5:
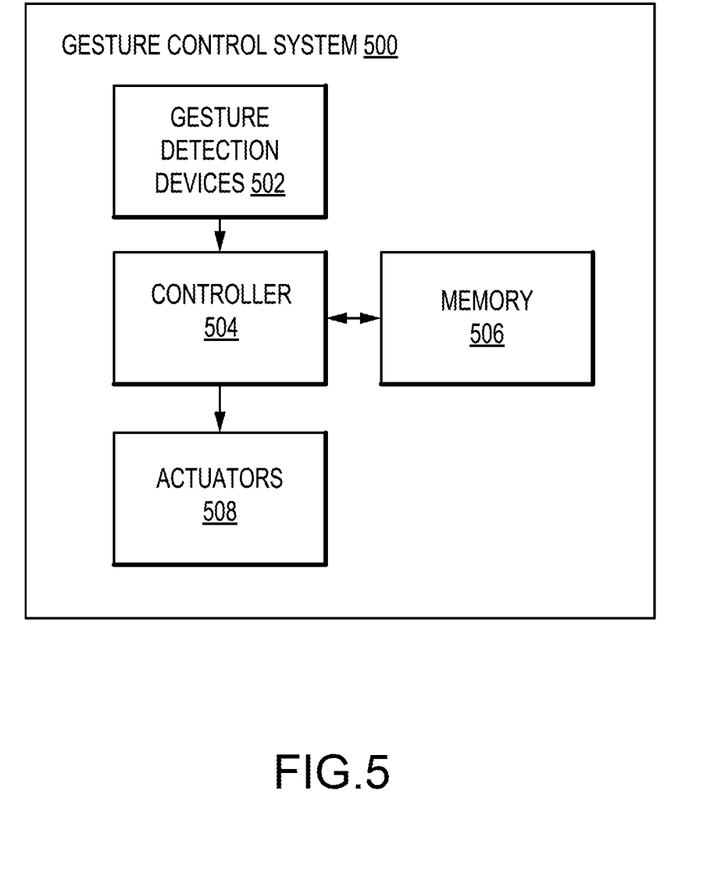
FIG. 5 illustrates a system that may be used to control in-flight services using gestures, according to various embodiments.

Referring now to FIG. 5, in accordance with various embodiments, a system that may be used to control in-flight services using gestures is illustrated. In various embodiments, the in-flight service may include turning a reading light on or off, turning the air-conditioning on or off, calling for assistance of a flight attendant, or opening or closing a door to an overhead storage bin. The gesture control system 500 may include one or more gesture detection devices 502, a controller 504, a memory 506, and a one or more actuators 508. In various embodiments, the one or more gesture detection devices 502 may be a sensor that senses a motion or movement made by the passenger. In various embodiments, the one or more gesture detection devices 502 detects a free space gesture, i.e., one or more of a movement of hands, fingers, or head, among others, of a user, i.e., a passenger, a flight crew member, or a maintenance crew member, among others. In that regard, if the free space gesture is a hands or fingers movement, the one or more gesture detection devices 502 may detect one or more of pointing, a wave, or sign language, among others. In various embodiment, the pointing may be pointing in an up direction, a down direction, a left direction, or a right direction. In various embodiments, if the free space gesture is a head movement, the one or more gesture detection devices 502 detects one or more of head pose, nod, eye movement, or facial expression, among others. In various embodiments, the one or more gesture detection devices 502 may detect a sequence of free space gestures to control an in-flight service. In various embodiments, the one or more gesture detection devices 502 may be a visual sensing device, ultrasound sensing device, an infrared proximity sensing device, or a graphical user interface (GUI), among others, to capture the input signals from the user. In various embodiments, the one or more gesture detection devices 502 may be a sensor module including an IR source and an IR camera that maps a three-dimensional (3D) space to identify a free space gesture. In various embodiments, the one or more gesture detection devices 502 may be located on a back of passenger seat to which another passenger seat is facing or on a bulkhead to which a passenger seat facing. In various embodiments, the one or more gesture detection devices 502, which may be electrically coupled to the controller 504, may be configured to provide the detected free space gesture or sequence of free space gestures to the controller 504.

In various embodiments, the controller 504 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 504 may further include any non-transitory memory known in the art. The memory may store instructions usable by the logic device to perform operations as described herein.

In various embodiments, the controller 504 may be electrically coupled to one or more gesture detection devices 502 and may be configured to receive the detected free space gesture or sequence of free space gestures from the one or more gesture detection devices 502. In various embodiments, the controller 504 may process the detected free space gesture or sequence of free space gestures to identify an in-flight service from a plurality of in-flight services to be performed based on the detected free space gesture or sequence of free space gestures. In order to identify the in-flight service from a plurality of in-flight services based on the detected free space gesture or sequence of free space gestures, in various embodiments, the controller 504 accesses memory 506 which stores a database of identified free space gestures and gesture free space sequences. In various embodiments, the controller 504 compares the received free space gesture or sequence of free space gestures to the identified free space gestures and free space gesture sequences stored in the database of identified free space gestures and free space gesture sequences in the memory 506 to identify a free space gesture or free space gesture sequence from the database of identified free space gestures and free space gesture sequences.

In various embodiments, if the free space gesture or sequence of free space gestures is unrecognizable, then the controller 504 may send a signal back to the one or more gesture detection devices 502 to inform the user of the unrecognizable free space gesture or sequence of free space gestures. In that regard, if the one or more gesture detection devices 502 is a GUI, the controller may provide a command that causes the GUI to display information informing the user to move closer to the GUI so that the free space gesture may be recognized or slow down the motion provided by the user so that the free space gesture may be recognized, among others. In that regard, if the one or more gesture detection devices 502 is a visual sensing device, ultrasound sensing device, or an infrared proximity sensing device, an indicator may be provided next to the one or more gesture detection devices 502 that provides an indication informing the user to move closer to the GUI so that the free space gesture may be recognized or slow down the motion provided by the user so that the free space gesture may be recognized, among others.

In various embodiments, the memory 506 further includes a gesture-to-in-flight service correlation database that provides a cross-reference or correlation of free space gestures and free space gesture sequences to in-flight services. In that regard, in various embodiment, the controller 504 uses an identified free space gesture or free space gesture sequence from database of identified free space gestures and free space gesture sequences to identify an associated in-flight service from the gesture-to-in-flight service correlation database. In various embodiments, once the controller has identified the in-flight service, the controller 540 may be configured to send a command to one or more of the one or more actuators 508 so that the one or more actuators perform the in-flight service. In various embodiment, the one or more actuators 508 may be coupled to the reading light, the gaspers, the flight attendant call signal, or the door to the overhead storage bin.

Accordingly, in various embodiments, users seated on their seat would be able to perform a free space gesture in front of the one or more gesture detection devices 502 to perform one or more in-flight service such as, turning a reading light on or off, turning the air-conditioning on or off, calling for assistance of a flight attendant, or opening or closing a door to an overhead storage bin. In various embodiments, performing one or more of these in-flight services provides touchless service such that the user would not have to get up from their seat and cause hindrance for the other fellow users as well as making services to users who are not able to accomplish these tasks easier.

Figure 6:
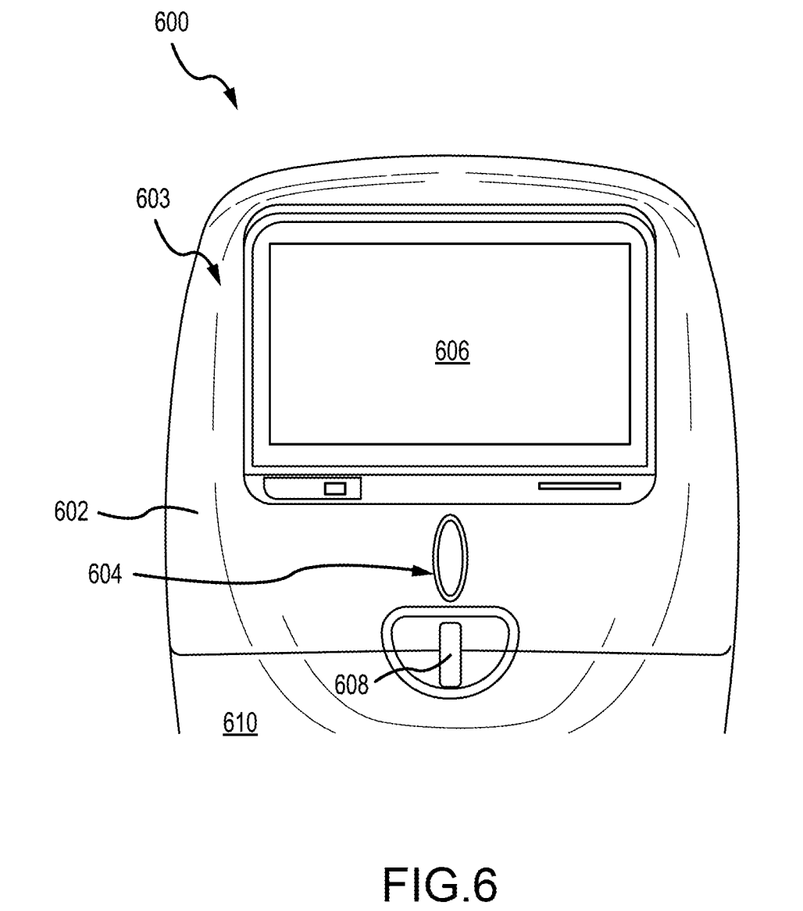
FIG. 6 illustrates a passenger seat with gesture detection devices for use in a cabin of an aircraft, according to various embodiments.

Referring now to FIG. 6, in accordance with various embodiments, a passenger seat with gesture detection devices for use in a cabin of an aircraft is illustrated. In various embodiments, the passenger seat 600, such as passenger seats 204 of FIG. 2, includes a seat back 602 with a seat assembly 603 onto which one or more gesture detection devices 604 or 606, such as one or more gesture detection devices 502 of FIG. 5, may be located. In various embodiments, the one or more gesture detection devices 604 or 606 are disposed proximate a latch 608. "Proximate" as disclosed herein refers to being spaced apart from, in accordance with various embodiments. The latch 608 may be configured to release a tray 610, in accordance with various embodiments. In this regard, latch 608 may retrain the tray 610 in a closed state in response to the latch 608 being in a first position as illustrated. In various embodiments, by rotating the latch 608, the tray 610 may be released and transition into an open state. Although illustrated as being configured to rotate, the latch 608 is not limited in this regard. For example, the latch 608 could include a push release, an automated release, or the like.

In various embodiments, the seat assembly 603 include one or more gesture detection devices 604 or 606. In various embodiments, the gesture detection devices 604 may be one or more of a visual sensing device, ultrasound sensing device, or an infrared proximity sensing device, among others, to capture the input signals from the user. Although illustrated as including a plurality of gesture detection devices 604, the present disclosure is not limited in this regard. For example, a seat assembly 603 having only one gesture detection device 604 is within the scope of this disclosure. In various embodiments, the gesture detection device 606 is a graphical user interface (GUI) to capture the input signals from the user. The gesture detection device 606 may be configured to display various media, such as movies, games, etc. In various embodiments, the one or more gesture detection devices 604 or 606 are electrically coupled to a power source and a controller. Although illustrated as including the gesture detection device 606, the present disclosure is not limited in this regard. For example, a seat assembly 603 without the gesture detection device 606 is within the scope of this disclosure.

Figure 7A:
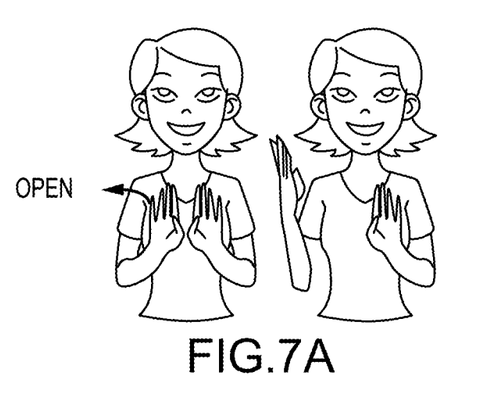
FIGS. 7A, 7B, 7C, and 7D illustrate a plurality of sign language gestures for use with gesture detection devices, according to various embodiments.
Figure 7B:
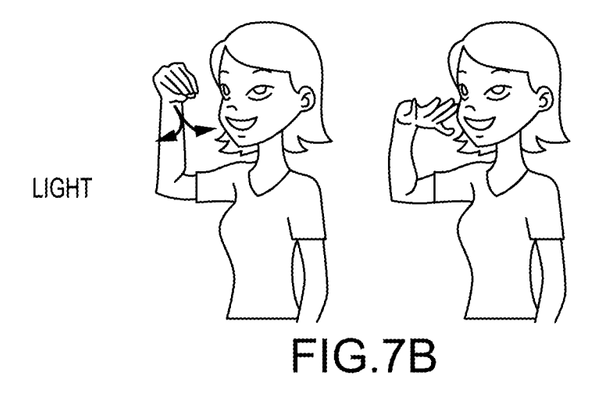
Figure 7C:
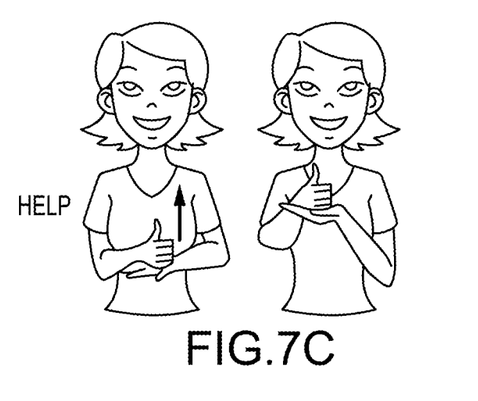
Figure 7D:
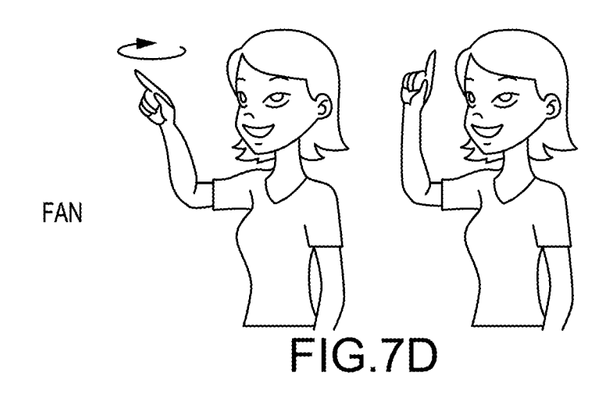

Referring now to FIGS. 7A, 7B, 7C, and 7D, in accordance with various embodiments, a plurality of sign language gestures for use with gesture detection devices are illustrated. That is, in addition to the one or more gesture detection devices, such as one or more gesture detection devices 604 or 606 of FIG. 6 and one or more gesture detection devices 502 of FIG. 5, detects a free space gesture, i.e., one or more of a movement of hands, fingers, or head, among others, of a user, i.e., a passenger, a flight crew member, or a maintenance crew member, among others, such as pointing, waving, head pose, nod, eye movement, or facial expression, among others, the gesture detection device may identify more specific free space gestures such as sign language. In various embodiments, the free space gesture that may be performed by the user may be sign language sign for "open," as illustrated in FIG. 7A, that would be associated with opening a door to an overhead storage bin. In various embodiments, the gesture that may be performed by the user may be sign language sign for "light," as illustrated in FIG. 7B, that would be associated with turning a reading light on or off. In various embodiments, the free space gesture that may be performed by the user may be sign language sign for "help," as illustrated in FIG. 7C, that would be associated with calling for assistance of a flight attendant. In various embodiments, the free space gesture that may be performed by the user may be sign language sign for "fan," as illustrated in FIG. 7D, that would be associated with turning the air-conditioning on or off. Although illustrated as including only these sign language signs, the present disclosure is not limited in this regard. For example, the free space gesture control system may be programmed with numerous sign language signs that may be associated with in-flight services that are within the scope of this disclosure.

Figure 8A:
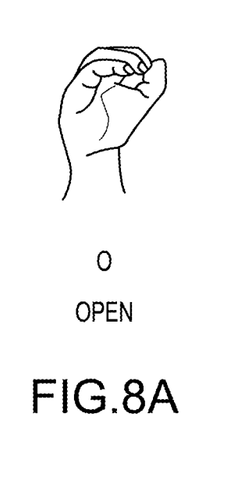
FIGS. 8A, 8B, 8C, and 8D illustrate a plurality of sign language letters that may be identified as gestures for use with gesture detection devices, according to various embodiments.
Figure 8B:
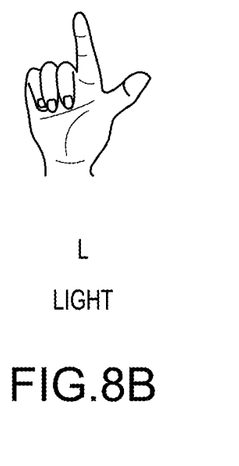
Figure 8C:
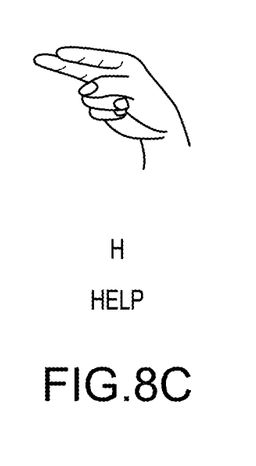
Figure 8D:
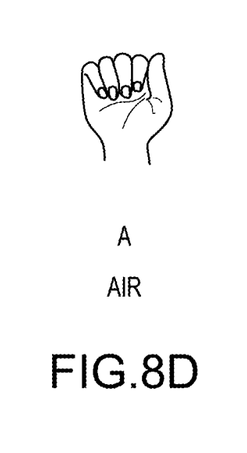

Referring now to FIGS. 8A, 8B, 8C, and 8D, in accordance with various embodiments, a plurality of sign language letters that may be identified as free space gestures for use with gesture detection devices are illustrated. That is, in addition to the one or more gesture detection devices, such as one or more gesture detection devices 604 or 606 of FIG. 6 and one or more gesture detection devices of FIG. 5, detects a free space gesture, i.e., one or more of a movement of hands, fingers, or head, among others, of a user, i.e., a passenger, a flight crew member, or a maintenance crew member, among others, such as pointing, waving, sign language, head pose, nod, eye movement, or facial expression, among others, the gesture detection device may identify more specific free space gestures such as sign language letters. In various embodiments, the free space gesture that may be performed by the user may be sign language letter "O," as illustrated in FIG. 8A, that would be associated with opening a door to an overhead storage bin. In various embodiments, the free space gesture that may be performed by the user may be sign language sign letter "L," as illustrated in FIG. 8B, that would be associated with turning a reading light on or off. In various embodiments, the free space gesture that may be performed by the user may be sign language sign letter "H," as illustrated in FIG. 8C, that would be associated with calling for assistance of a flight attendant. In various embodiments, the free space gesture that may be performed by the user may be sign language sign letter "A," as illustrated in FIG. 8D, that would be associated with turning the air-conditioning on or off. Although illustrated as including only these sign language letters, the present disclosure is not limited in this regard. For example, the gesture control system may be programmed with numerous sign language letter that may be associated with in-flight services that are within the scope of this disclosure.

Figure 9:
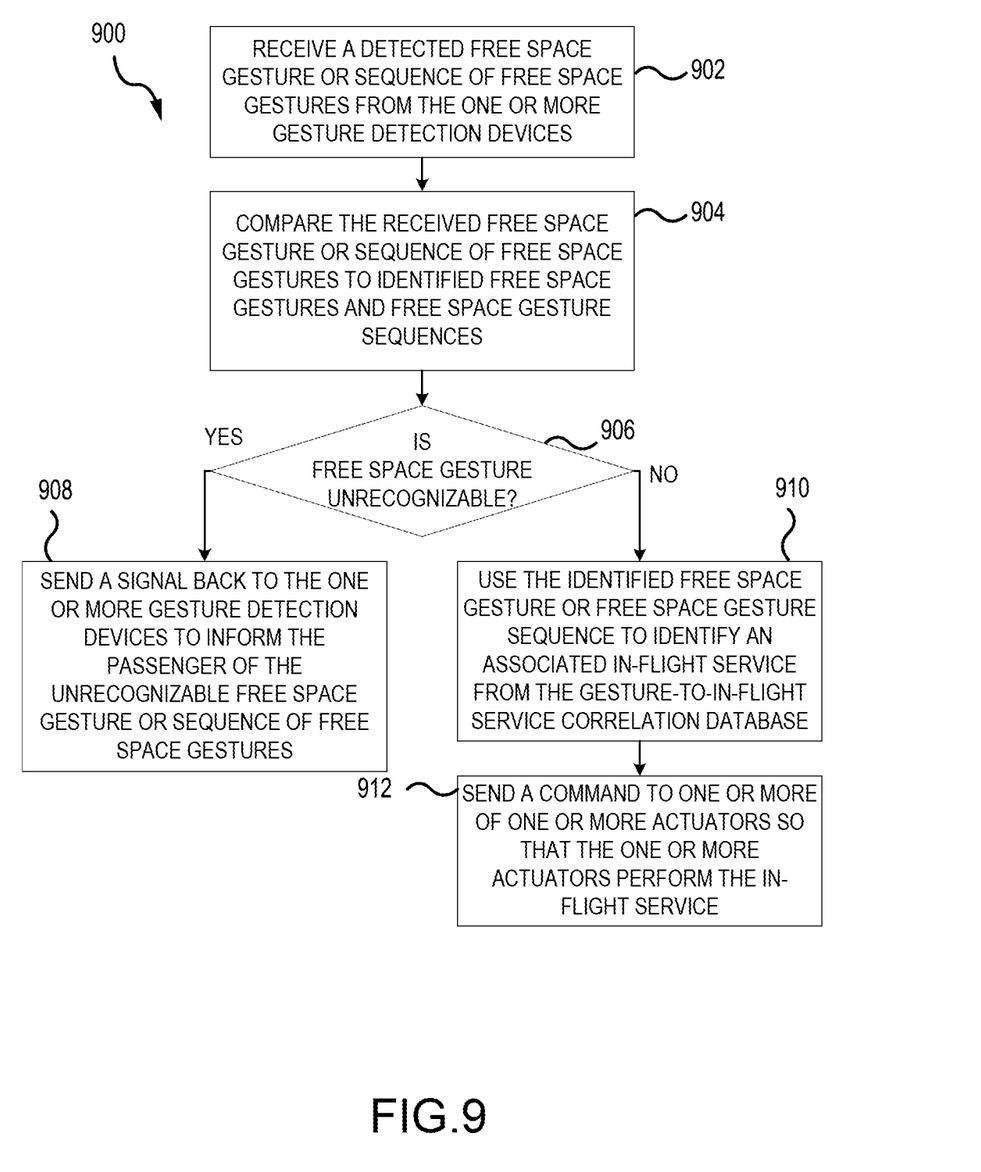
FIG. 9 illustrates a method for controlling in-flight services using gestures, according to various embodiments.

Referring now to FIG. 9, in accordance with various embodiments, a method for controlling in-flight services using gestures is illustrated. The method 900 may be performed by a controller, such as controller 504 described above with respect to FIG. 5. At block 902, the controller may be configured to receive a detected free space gesture or sequence of free space gestures from the one or more gesture detection devices such as one or more gesture detection devices 604 or 606 of FIG. 6 and one or more gesture detection devices 502 of FIG. 5. At block 904, the controller may be configured to compare the received free space gesture or sequence of free space gestures to identified free space gestures and free space gesture sequences stored in the database of identified free space gestures and free space gesture sequences in a memory. At block 906, the controller may be configured to determine whether free space gesture is unrecognizable. If at block 906 the free space gesture is unrecognizable, at block 908, the controller may be configured to send a command back to the one or more gesture detection devices so that the one or more gesture detection devices inform the user of the unrecognizable free space gesture or sequence of free space gestures. If at block 906, the free space gesture is recognizable, i.e., a failure to identify a recognizable command, then at block 910 the controller may be configured to use the identified free space gesture or free space gesture sequence from the database of identified free space gestures and free space gesture sequences to identify an associated in-flight service from the gesture-to-in-flight service correlation database. At block 912, once the controller has identified the in-flight service, the controller may be configured to send a command to one or more of one or more actuators so that the one or more actuators perform the in-flight service.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for controlling in-flight services using gestures, the system comprising:
    a gesture detection device, wherein the gesture detection device comprises a graphical user interface (GUI);
    a controller, wherein the controller is configured to:
        receive a detected free space gesture from the gesture detection device;
        compare the detected free space gesture to a plurality of identified free space gestures;
        responsive to identifying a free space gesture from the plurality of identified free space gestures, identify an associated in-flight service based on the identified free space gesture; and
        responsive to identifying the associated in-flight service, send a first command to an actuator to perform the associated in-flight service;
    the actuator, wherein the actuator is configured to, responsive to receiving the first command, execute the first command thereby performing the associated in-flight service;
    wherein the controller is further configured to:
        responsive to a failure to identify the free space gesture from the plurality of identified free space gestures, send a second command to the gesture detection device to display at least one of information informing a user to move closer to the GUI so that the free space gesture may be recognized or information informing the user to slow down a motion provided by the user so that the free space gesture may be recognized; and
    the gesture detection device configured to display the at least one of the information informing the user to move closer to the GUI so that the free space gesture may be recognized or the information informing the user to slow down a motion provided by the user so that the free space gesture may be recognized.

2. The system of claim 1, wherein the detected free space gesture is at least one of a movement of hands, fingers, or a head.

3. The system of claim 2, wherein the movement of the head is at least one of a head pose, a nod, an eye movement, or a facial expression.

4. The system of claim 2, wherein the movement of the fingers is at least one of pointing in at least one of an up direction, a down direction, a left direction, or a right direction.

5. The system of claim 2, wherein the movement of the hands is a wave or sign language.

6. The system of claim 5, wherein the sign language comprises a sign language sign or a sign language letter.

7. The system of claim 1, wherein the associated in-flight service is at least one of turning on a reading light, turning off the reading light, turning on air, turning off the air, turning on a flight attendant call signal, opening a door to a storage bin, or closing the door to the storage bin.

8. The system of claim 1, wherein the gesture detection device is at least one of a visual sensing device, ultrasound sensing device, an infrared proximity sensing device, or a sensor module including an IR source and an IR camera.

9. The system of claim 1, wherein the free space gesture is a sequence of free space gestures.

10. A method for controlling in-flight services using gestures, the method comprising:
receiving, by a controller, a detected free space gesture from a gesture detection device;
comparing, by the controller, the detected free space gesture to a plurality of identified free space gestures;
responsive to identifying a free space gesture from the plurality of identified free space gestures:
identifying, by the controller, an associated in-flight service based on the identified free space gesture;
responsive to identifying the associated in-flight service, sending, by the controller, a first command to an actuator to perform the associated in-flight service; and
executing, by the actuator, the first command thereby performing the associated in-flight service; and
responsive to a failure to identify the free space gesture from the plurality of identified free space gestures:
sending, by the controller, a second command to the gesture detection device to display at least one of information informing a user to move closer to the GUI so that the free space gesture may be recognized or information informing the user to slow down a motion provided by the user so that the free space gesture may be recognized; and
displaying, by the gesture detection device that comprises a graphical user interface (GUI), the at least one of the information informing the user to move closer to the GUI so that the free space gesture may be recognized or the information informing the user to slow down a motion provided by the user so that the free space gesture may be recognized.

11. The method of claim 10, wherein the detected free space gesture is at least one of a movement of hands, fingers, or a head.

12. The method of claim 11, wherein the movement of the head is at least one of a head pose, a nod, an eye movement, or a facial expression.

13. The method of claim 11, wherein the movement of the fingers is at least one of pointing in at least one of an up direction, a down direction, a left direction, or a right direction.

14. The method of claim 11, wherein the movement of the hands is a wave or sign language.

15. The method of claim 14, wherein the sign language comprises a sign language sign or a sign language letter.

16. The method of claim 10, wherein the associated in-flight service is at least one of turning on a reading light, turning off the reading light, turning on air, turning off the air, turning on a flight attendant call signal, opening a door to a storage bin, or closing the door to the storage bin.

17. The method of claim 10, wherein the gesture detection device is at least one of a visual sensing device, ultrasound sensing device, an infrared proximity sensing device, or a sensor module including an IR source and an IR camera.

18. The method of claim 10, wherein the free space gesture is a sequence of free space gestures.

* * * * *